(12) United States Patent
Seo et al.

(10) Patent No.: US 6,307,704 B1
(45) Date of Patent: Oct. 23, 2001

(54) DATA RECORDING MEDIUM AND DATA RECORDING/REPRODUCING DEVICE WITH INCREASED STORAGE CAPACITY

(75) Inventors: Yuzo Seo; Hiroyuki Ikeda, both of Kanagawa (JP)

(73) Assignee: Mitsubishi Chemical Corporation, Tokyo (JP)

( * ) Notice: Subject to any disclaimer, the term of this patent is extended or adjusted under 35 U.S.C. 154(b) by 0 days.

(21) Appl. No.: 09/373,193

(22) Filed: Aug. 12, 1999

(30) Foreign Application Priority Data

| Aug. 19, 1998 | (JP) | 10-232818 |
| Sep. 9, 1998 | (JP) | 10-272552 |
| Sep. 9, 1998 | (JP) | 10-272554 |
| Sep. 21, 1998 | (JP) | 10-266047 |
| Jan. 6, 1999 | (JP) | 11-001043 |

(51) Int. Cl.$^7$ ............................. G11B 5/596; G11B 5/09
(52) U.S. Cl. ............................ 360/77.08; 360/48
(58) Field of Search ........................... 360/48, 77.08

(56) References Cited

U.S. PATENT DOCUMENTS

| 4,334,252 | * | 6/1982 | Toriu | 360/234 |
| 4,669,004 | * | 5/1987 | Moon et al. | 360/77.08 |
| 5,943,180 | | 8/1999 | Seo et al. | 360/77.12 |

* cited by examiner

*Primary Examiner*—Nabil Hindi
*Assistant Examiner*—Regina Y. Neal
(74) *Attorney, Agent, or Firm*—Oblon, Spivak, McClelland, Maier & Neustadt, P.C.

(57) ABSTRACT

A recording disk has a data area and a servo-burst area alternately arranged with each other in the circumferential direction of the disk. The servo-burst area has a servo-burst pattern having signal sections and non-signal sections arranged with a period $\lambda$ in the radial direction of the disk. The period $\lambda$ is expressed by $\lambda=2p \times n/m$ in terms of track pitch "p" of the disk, wherein n and m are integers prime to each other provided that n/m<2.

16 Claims, 14 Drawing Sheets

DATA RECORDING MEDIUM AND DATA RECORDING/REPRODUCING DEVICE WITH INCREASED STORAGE CAPACITY

BACKGROUND OF THE INVENTION (a). Field of the Invention

The present invention relates to a data recording medium and a data recording/reproducing device and, more particularly, to a technique for positioning control of recording/reproducing heads onto a desired track of a recording medium by using a servo-burst signal.

In a computer system, hard disk drives are widely used for storing a large amount of information. For increasing the recording capacity of the hard disk drive, it is desired to increase the recording density of the recording disk in the circumferential direction (moving direction) as well as the radial direction (direction normal to the moving direction) of the recording disk. The increase of the recording density in the radial direction can be achieved by increasing the track density of the recording disk.

The increase of the tracking density highlights an error due to vibration or thermal expansion in the relative location of the recording/reproducing head with respect to the recording disk in the radial direction. The correction of the position error is generally achieved by using a servo-burst pattern recorded on the recording disk. Specifically, the reproducing head reads the servo-burst pattern, which is then subjected to signal processing by a tracking system of the disk drive for accurately positioning the reproducing head onto the data track.

FIG. 1 shows a part of a conventional recording disk, generally designated by numeral 100, using a sampled servo-burst scheme. In the recording disk 100, each data track 11 is periodically divided into a plurality of data blocks 12 in a circumferential direction (U), and a plurality of data blocks 12 arranged in the radial direction (R) from the inner periphery to the outer periphery of the disk forms a data area 10. A servo-burst area 20 is provided between each adjacent two of the data area 10. In the servo-burst area 20, four types of servo-burst signals A, A⁻, B and B⁻ are successively recorded in the circumferential direction, wherein each type of servo-burst signals is disposed in a column extending in the radial direction. Signal "A" and signal "B" have an equal length, which is equal to the track pitch "p", and deviated in the radial direction by p/2 from each other. Signal A⁻ and signal B⁻ are recorded at the locations where signal A and signal B, respectively, are not recorded, i.e., at the locations where A⁻ and B⁻ supplement signal A and signal B, respectively. The centers of signals A and A⁻ as viewed in the radial direction are aligned with the centers of the gaps between the adjacent data tracks 11, whereas the centers of signals B and B⁻ as viewed in the radial direction are aligned with the centers of the data tracks 11.

The recording/reproducing device includes a single reproducing head (or a single recording and reproducing head) 31, which reproduces the servo-burst signals. The reproduced signal provides the amount of displacement of the head with respect to the center of the data track 11 for allowing the recording/reproducing device to control the location of the reproducing head.

In the conventional recording disk 100 having the servo-burst area as described above, the servo-burst signals arranged in the four columns occupy a large area, which reduces the data areas or effective user area in the recording disk.

In addition, with the recent increase of the track density of the recording disk, about 2 kHz is generally required for the response frequency of the servo-burst signal, whereas as high as about 20 kHz is required for the frequency of the servo-burst signal itself. In the disk drive adapted for the high frequency and having a rotational speed higher than 100 rps (rotations per second) or 6000 rpm (rotations per minute), the number of servo-burst signals required in a single rotation ranges 100 to 200. This involves a problem of reduced recording capacity due to the large occupied area for the servo-burst signals and a reduced user area.

SUMMARY OF THE INVENTION

It is therefore an object of the present invention to provide a data recording medium having an increased user area and reduced servo-burst areas as well as a recording/reproducing device having such a recording medium, by improving the servo-burst signals used for positioning control and a technique for detecting the servo-burst signals even in the case of a reduced track pitch.

The present invention provides a recording medium including a plurality of data tracks extending in a moving direction of the recording medium and arranged with a track pitch "p" in a normal direction perpendicular to the moving direction, each of the data tracks having a plurality of data blocks arranged in the moving direction, a plurality of the data blocks arranged in the normal direction forms a data area, a servo-burst area disposed between each adjacent two of the data area, the servo-burst area including a periodic servo-burst pattern having a period $\lambda$, wherein $\lambda = 2p \times n/m$, given n and m being natural numbers prime to each other, with a relationship $n/m < 2$ therebetween.

The present invention also provide a data recording/reproducing device for recording/reproducing data to/from the recording medium as described above.

More specifically, the data recording/reproducing device includes first and second reproducing heads arranged in the normal direction with a pitch of (2j+1)p, given j being an integer not lower than zero.

Alternatively, the data recording/reproducing device includes first through third reproducing heads arranged in the normal direction so that distances between the first reproducing head and the second reproducing head and between the first reproducing head and the third reproducing head are (2j+1)p and (4k+2)p, given j and k being integers not lower than zero.

Alternatively, the recording/reproducing device includes first through fourth reproducing heads arranged in the normal direction so that distances between the first reproducing head and the second reproducing head, between the first reproducing head and the third reproducing head and between the first reproducing head and the fourth reproducing head are (2j+1)p, (4k+2)p and (4l+3)p, given j, k and l being integers not lower than zero.

In accordance with the recording medium of the present invention, the area for the servo-burst areas can be reduced. The reduced servo-burst areas can increase the total user area and thus increase the recording capacity of the recording medium, without degrading the accuracy of the positioning control of the reproducing heads, which are disposed in operative relationship with the servo-burst area according to the data recording/reproducing device of the present invention.

The above and other objects, features and advantages of the present invention will be more apparent from the following description, referring to the accompanying drawings.

PREFERRED EMBODIMENTS OF THE INVENTION

Figure 1:
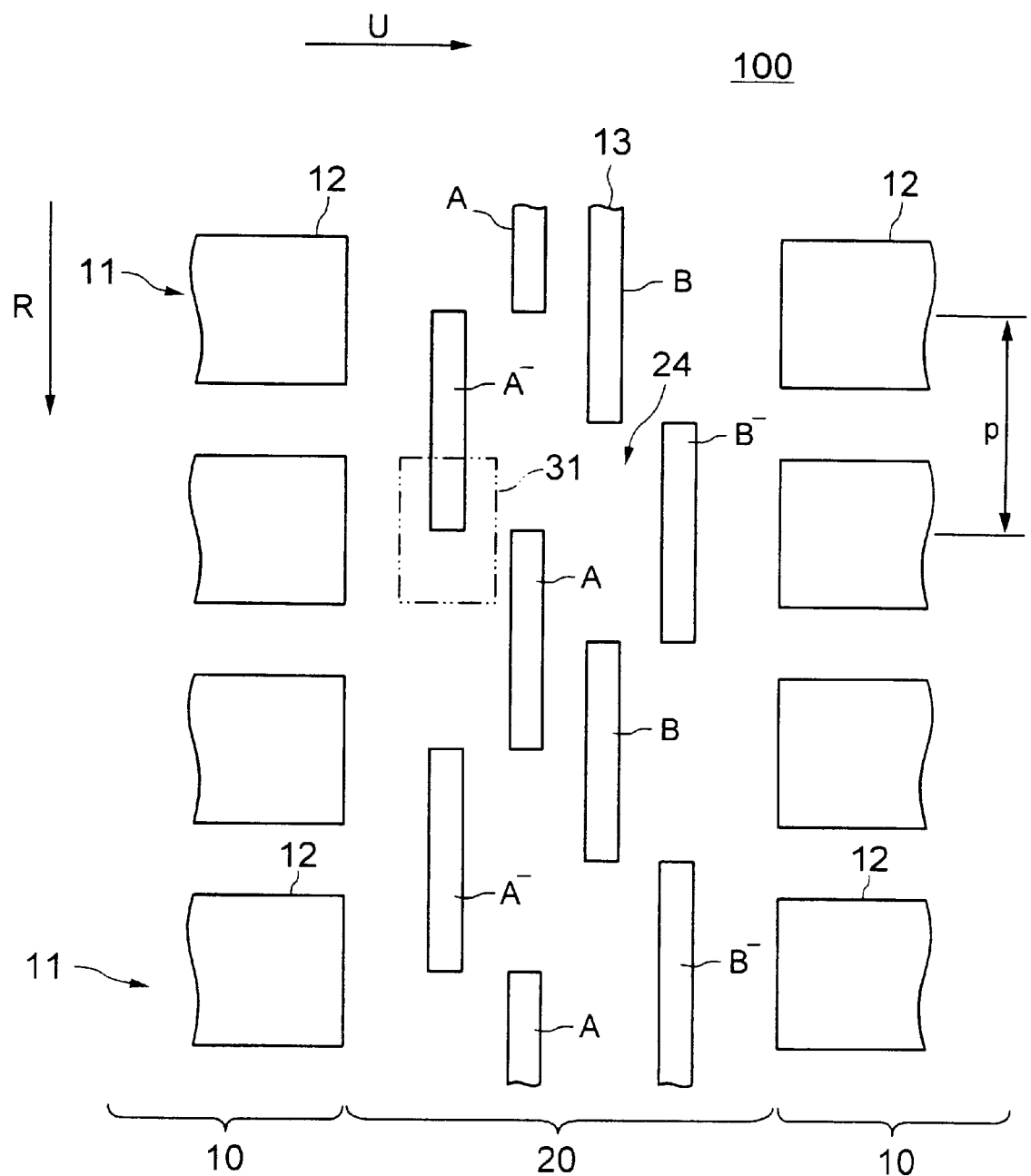
FIG. 1 is a partial top plan view of a conventional recording disk having a servo burst-area between data areas.

Now, the present invention is more specifically described with reference to accompanying drawings, wherein similar constituent elements are designated by similar reference numerals throughout the drawings.

Figure 2:
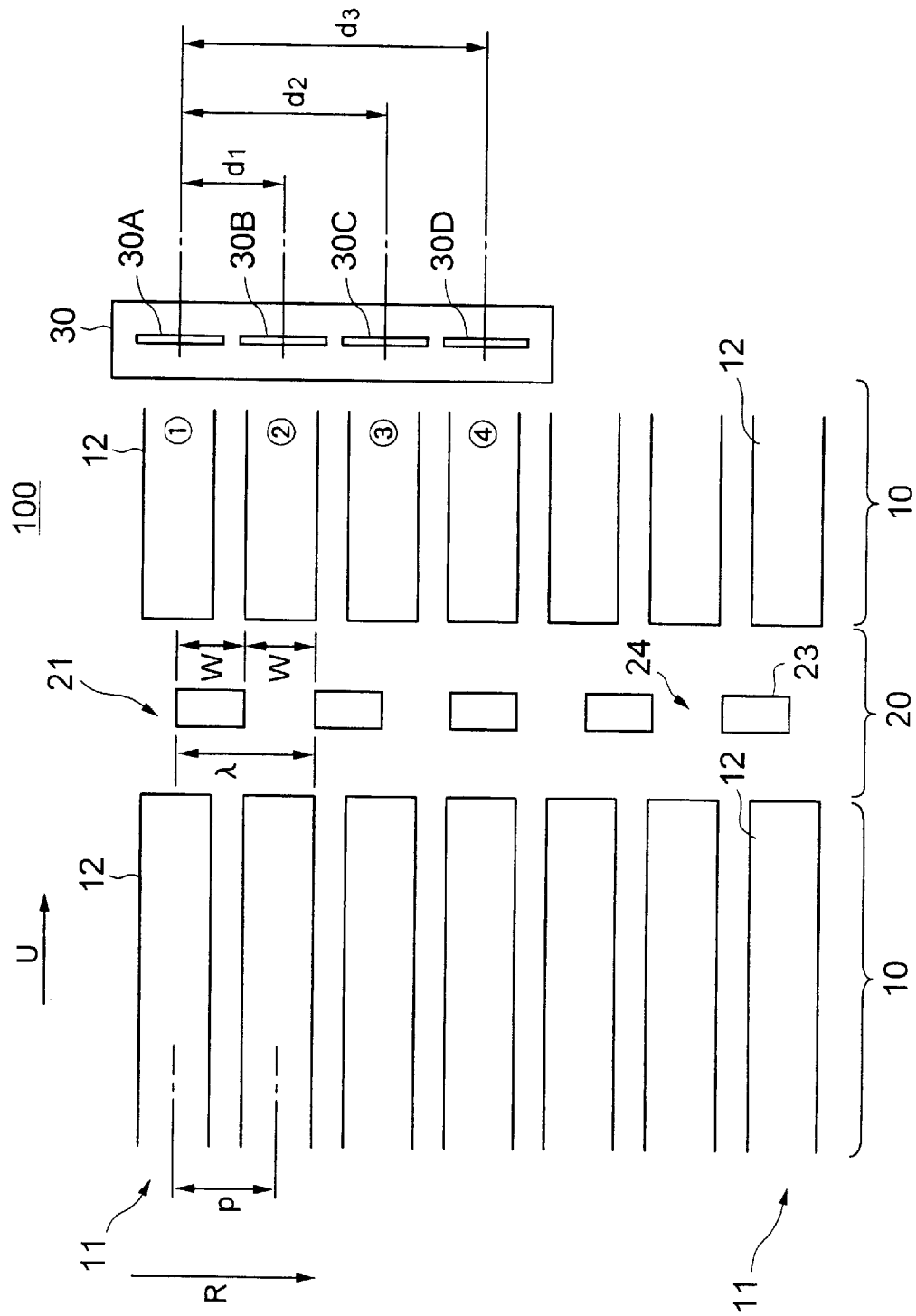
FIG. 2 is a partial top plan view of a recording medium (recording disk) according to a first embodiment of the present invention.

Referring to FIG. 2, a recording medium, generally designated by numeral 100, according to a first embodiment of the present invention is implemented as a recording disk or a hard disk. The recording disk 100 is shown together with a head assembly 30 including four reproducing heads 30A, 30B, 30C and 30D for reading data from data tracks 11 of the recording disk 100.

On the recording surface of the recording disk 100, a plurality of data tracks 11 are disposed extending in the circumferential direction "U" of the disk and arranged in the radial direction "R" with a constant pitch "p". Each data track 11 is divided in the circumferential direction to form a plurality of data blocks 12. A group of data blocks 12 arranged in the radial direction "R" forms a data area 10, and a servo-burst area 20 is disposed between each adjacent two of the data area 10. Each servo-burst area 20 includes a columnar servo-burst pattern 21 having signal sections 23 and non-signal sections 24 alternately arranged with a specified period $\lambda$ in the radial direction. Each of the signal sections 23 and the non-signal sections 24 has a length of W, wherein $\lambda = 2W$.

The length W of the signal section 23 is expressed in terms of track pitch "p", defined as a distance between centers of adjacent two tracks, as follows:

$$W = 2p/(2i+3)$$

wherein "i" is an integer not lower than zero.

If i=0, then W=2p/3 as in the case shown in FIG. 2. This provides an accurate tracking signal due to a smaller length W of the signal section 23 compared to the track pitch. This example corresponds to the case wherein n=2 and m=3 are substituted for the expression $\lambda = 2p \times n/m$ as defined in the present invention, to obtain $\lambda = 4p \times 3$ because $\lambda = 2W$.

The disk drive includes a set of four reproducing heads 30A, 30B, 30C and 30D arranged in the radial direction "R" on a head assembly 30 with a pitch defined in terms of the track pitch "p". The center of each reproducing head is controlled by the positioning control to be aligned with the track center. The reproducing heads generate reproduced servo-burst signals A, A$^-$, B and B$^-$ from the servo-burst area of the recording disk.

The distances d1, d2 and d3 as shown in FIG. 2 between the outermost head 30A and the other heads 30B, 30C and 30D, respectively, are expressed in terms of the track pitch "p" as follows:

d1=(2j+1)p d2=(4k+2)p d3=(4l+3)p wherein j, k and l are integers not lower than zero.

If j=k=l=0 in the above expression, then d1=p, d2=2p and d3=3p, which correspond to the case shown in FIG. 2. In other word, the pitch of the reproducing heads is equal to the track pitch "p". In this configuration of the reproducing heads, upon movement of the head assembly 30 in the radial direction "R" with respect to the recording disk 100, reproduced signals A, A$^-$, B and B$^-$ are such that the reproduced signals A and B are periodic signals having a phase difference of 90° therebetween, signals A and A$^-$ have opposite phases with respect to each other, and signals B and B$^-$ have opposite phases with respect to each other. These reproduced signals enable an accurate positioning control of the reproducing heads.

Due to the relationship of opposite phases between the signal A output from the reproducing head 30A and the signal A output from the reproducing head 30C, the signal A-A$^-$ can be used as a locational signal which is free from the influence by the offset fluctuation (zero point fluctuation) and a higher-harmonic distortion which is caused by higher-harmonic waves of the reproduced signals. The signal B output from the reproducing head 30B is also opposite in phase to the signal B$^-$ output from the reproducing head 30D. Thus, the signal B-B$^-$ also can be used as another locational signal which is free from the influence by the offset fluctuation and the higher-harmonic distortion. In an alternative of the configuration as described above, the reproducing head 30D can be omitted while using the symmetrical relationship between the signals, wherein B-B$^-$=2B-(A+A$^-$) holds.

Figure 3:
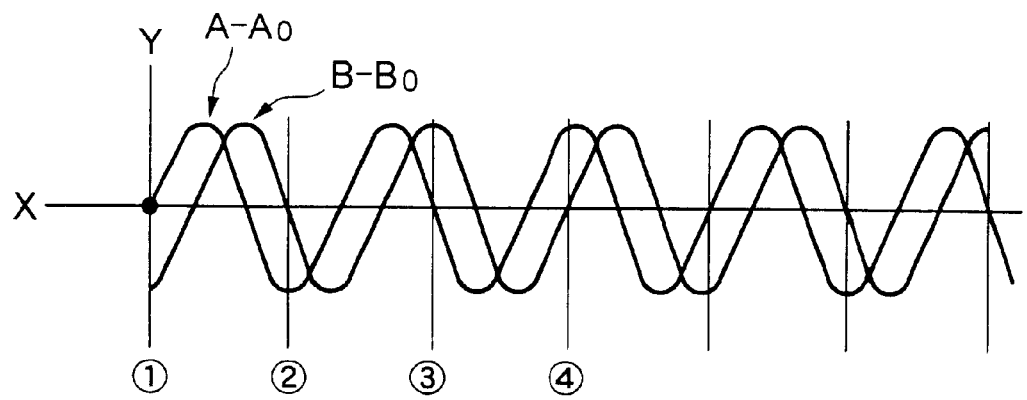
FIG. 3 is a graph for showing servo-burst signals output from the reproducing head shown in FIG. 2.

Referring to FIG. 3, there are shown signals A-A0 and B-B0 obtained by subtracting constants A0 and B0 from the reproduced signals A and B, respectively, output from the reproducing heads 30A and 30B. In the disk drive used for the recording disk of the present embodiment, the reproducing heads 30A and 30B are disposed adjacent to each other in the radial direction "R", as in the case of the encoder signal generally used for the positioning control, for reading signal section 23 and the non-signal section 24, respectively, in the servo-burst area 20 on the recording disk 100. The reproduced signals A and B are delivered as sinusoidal signals having a phase difference of 90° therebetween, as shown in FIG. 3.

The constant A0 may preferably be calculated, by using a correcting calculation, as a mean of the signal A and the signal $A^-$ if both the signals are reproduced. That is, the differential signal $A-A^-$ is used as the locational signal based on the relationship $A-A0=A-(A+A^-)/2=(A-A^-)/2$. The constant B0 may also be obtained by using the correcting calculation similarly to the constant A0.

The reproduced signals $A^-$ and $B^-$ output from the other reproducing heads 30C and 30D are similar to those shown in FIG. 3. The numerals ①  to ④ correspond to the centers of the data tracks 11 which are similarly numbered and arranged as the outermost four tracks corresponding to the reproducing heads 30A to 30D, as shown in FIG. 2.

In an alternative, two reproducing heads 30A and 30B may be sufficient without using the heads 30C and 30D for positioning control of the head assembly 30. In this case, since the signals $A^-$ and $B^-$ cannot be directly obtained from the reproducing heads, the signals $A^-$ and $B^-$ are calculated based on the principle of the two-phase signals that one of the two-phase signals assumes a maximum or a minimum when the other of the two-phase signals assumes zero. More specifically, the process includes the steps of selecting suitable initial values for expected values of A0 and B0, storing a calculated value for A as the maximum of A if the calculated value for A is larger than the expected value of A0 when B−B0 assumes zero or the calculated value for A as the minimum of A if the actual value for A is smaller than the expected value of A0 when B−B0 assumes zero, averaging the maximum and the minimum to obtain another expected value for A0 which is closer to the true value for A0 compared to the initial value for A0, and iterating the above procedure for several times to thereby obtain accurate values for the constants A0 as well as B0.

Figure 4:
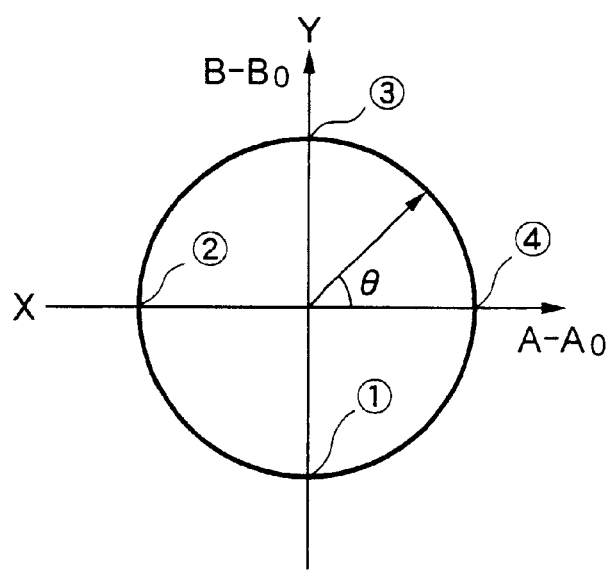
FIG. 4 is a graph of a circular Lissajous figure obtained by synthesis of the servo-burst signals shown in FIG. 3.

Referring to FIG. 4, there is shown a circular Lissajous figure obtained by synthesizing the reproduced, sinusoidal signals A and B, wherein A−A0 and B−B0 are plotted on the X-axis and the Y-axis, respectively. These values are obtained by subtracting A0 and B0 from the servo-burst signals A and B, respectively, output from the reproducing heads 30A and 30B.

Other servo-burst signals $A^-$ and $B^-$ output from the reproducing heads 30C and 30D are represented similarly to the signals shown in FIG. 3. In FIGS. 3 and 4, numerals ①, ②, ③ and ④ correspond to those shown in FIG. 2.

The locations at which the reproducing heads 30A and 30B should essentially reside correspond to the intersections between the circular Lissajous figure and the coordinate axes in FIG. 4. That is, by correcting the locations of the reproducing heads so that the reproduced servo-burst signals reside on the intersections, the reproducing heads can be located on the track centers for positioning control.

If four reproducing heads or more are installed in the disk drive, the reproduced signals from the reproducing heads which reproduce servo burst-signals having the same phase are averaged for obtaining more accurate locational signals. In addition, a larger number of the reproducing heads provide a higher reproducing speed, although two of the reproducing heads are basically sufficient for the positioning control thereof.

Although one of the reproducing heads may be used for recording, a dedicated recording head is preferably provided separately from the reproducing heads because the recording head generally has a lower processing speed compared to the reproducing heads. If a dedicated recording head is provided in the disk drive, the recording head is aligned with a corresponding one of the reproducing heads in the radial position thereof.

Figure 5:
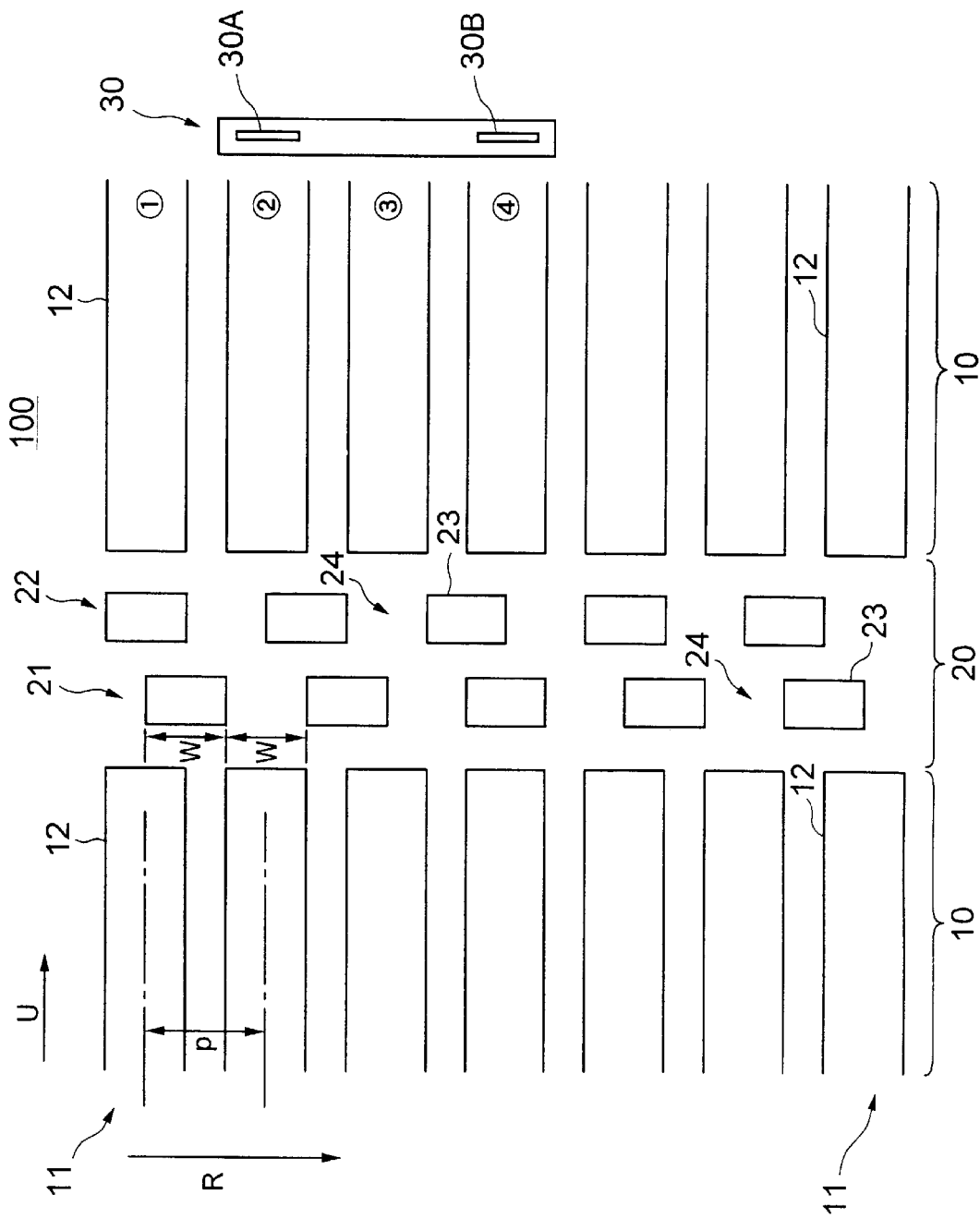
FIG. 5 is a partial top plan view of a recording disk according to a second embodiment of the present invention.

Referring to FIG. 5, a recording disk 100 according to a second embodiment of the present invention is similar to the first embodiment except that each servo-burst area 20 includes two columns of the servo-burst pattern including a first column pattern 21 and a second column pattern 22. Both the column patterns 21 and 22 are deviated from each other in the radial direction "R" by $\lambda/4$, wherein $\lambda$ is the period for each pattern and equals to 4p/m.

The recording disk of FIG. 5 is implemented as a hard disk, wherein each track 11 is around 1 to 3 micrometers wide, for example. The track pitch "p" may be slightly larger than the width of each track 11.

The number of data blocks 12 disposed in the circumferential direction "U" depends on the rotational speed of the hard disk, and may be 84 in a typical example. In this case, a ratio as high as about 90% can be obtained as the ratio of the total data areas 10 to the total recording area of the hard disk including all the data areas 10 and the servo-burst areas 20. In other word, the total of the servo-burst area 20 is suppressed to as low as about 10% of the total area for the hard disk.

The hard disk of FIG. 5 is rotated at a rotational speed of 5400 to 20000 rpm, for example, and uses two reproducing heads 30A and 30B, which may be used as a recording head.

The disk drive which drives the recording disk 100 of FIG. 5 has a head assembly 30 supported on a supporting member and including two reproducing heads 30A and 30B, which are arranged at a pitch of (4k+2)p wherein k is an integer not lower than zero. The reproducing heads 30A and 30B read the servo-burst patterns 21 and 22, and generate four servo-burst signals. The disk drive calculates, based on the four servo-burst signals, two-phase servo-burst signals having a phase difference of 90° therebetween, calculates locational deviation of the reproducing heads 30A and 30B with respect to the center of the track 100 and controls the head assembly 30 based on the calculated deviation.

The pitch of the heads in FIG. 5 is selected at 2p, wherein k=0 is substituted for the above expression (4k+2)p. That is, the pitch of the heads 30A and 30B is equal to twice the track pitch, and also 1.5 times the period $\lambda$ for each column pattern wherein $\lambda$ is expressed by $\lambda=4p/3$.

As described above, each of the heads 30A and 30B reads the servo-burst patterns 21 and 22. When the head 30A is to be controlled to reside on the center of the outermost track ① in FIG. 5, assuming that the maximum level of the reproduced signal from the head 30A is a unit level (by normalizing), the head 30A on the center of the track ① reproduces a ½ level from the first column pattern 21 for the signal A, and at the same time the head 30B reproduces a ½ level from the first column pattern 21 for the signal $A^-$. In addition, the head 30A reproduces a unit level from the second column pattern 22 for the signal B, and at the same time the head 30B reproduces a zero level from the second column pattern 22 for the signal $B^-$.

Figure 6:
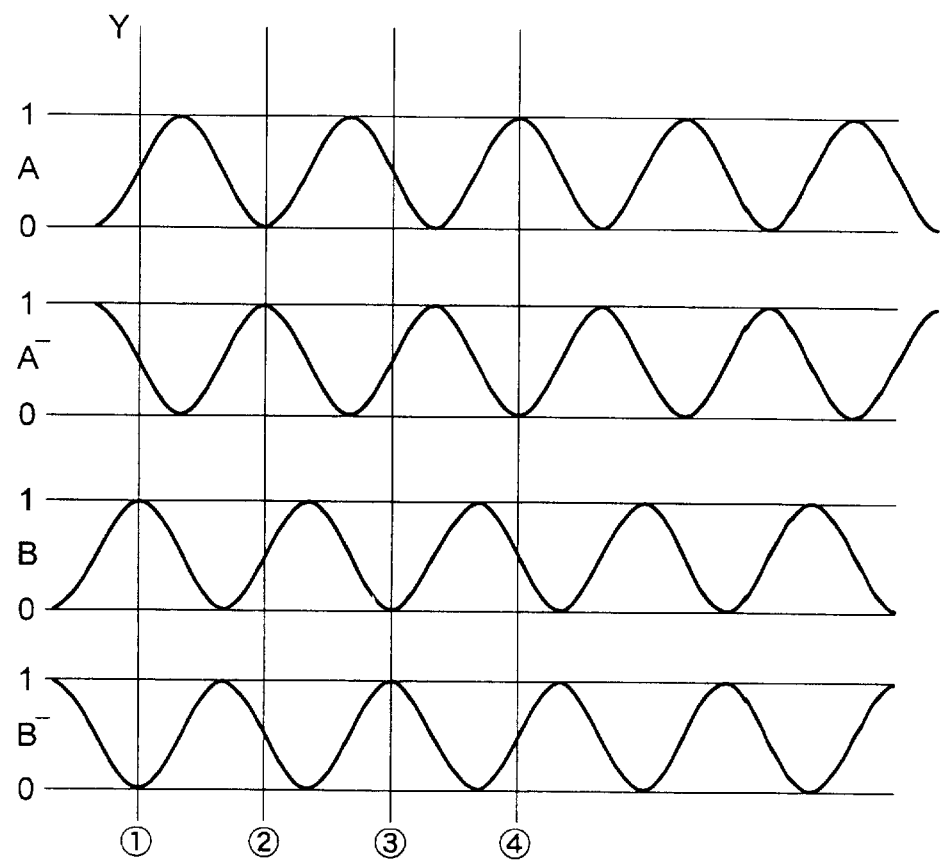
FIG. 6 is a graph showing four servo-burst signals obtained from the recording disk of FIG. 5.

Referring to FIG. 6, there are shown four reproduced signals A, $A^-$, B and $B^-$ output from the heads 30A and 30B upon movement of the heads 30A and 30B in the direction shown by arrow "R", wherein signals A and $A^-$ have opposite phases with respect to each other, signals B and $B^-$ have opposite phases with respect to each other, signals A and B have a phase difference of 90° therebetween, and signals $A^-$ and $B^-$ have a phase difference of 90° therebetween.

Figure 7:
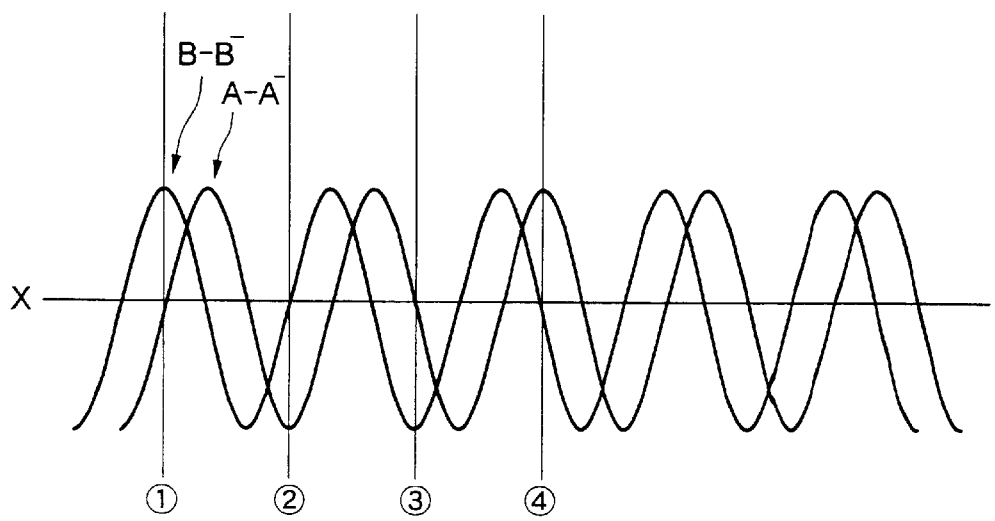
FIG. 7 is a graph of a pair of signals obtained by synthesis of the servo-burst signals shown in FIG. 6.

By subtracting signal A⁻ from signal A and signal B⁻ from signal B, sinusoidal signals including A–A⁻ signal and B–B⁻ signal, which have a phase difference of 90° therebetween as shown in FIG. 7, can be obtained. Further, A–A⁻ signal and B–B⁻ signal are plotted on X-axis and Y-axis, respectively, to obtain a circular Lissajous figure shown in FIG. 8.

The locations of the reproducing heads 30A and 30B are expressed by the locus of the circular Lissajous figure, that is, are defined by the vector angle θ formed between the A–A⁻ signal and the B–B⁻ signal. For example, if the head 30A resides on the outermost track ①, θ is equal to π/2, and if the head resides on the second outermost track ②, θ is equal to π. Thus, by calculating the vector angle θ, the deviation of the heads 30A and 30B with respect to the track center can be detected, whereas the direction of the deviation can be also detected by the increase and decrease of the vector angle θ. Based on the results of detection, the head assembly 30 can be controlled for tracking. The vector angle θ is simply calculated by taking arctangent of ratio of signal B–B⁻ to signal A–A⁻.

The width for writing data and the width for reading data are generally controlled at about 80% and 60%, respectively, of the track pitch "p" in a disk drive using a magnetic recording scheme, in consideration of allowing some inevitable errors to occur in the positioning control. In this case, about 10% of the track pitch "p" is the theoretically allowable error for the positioning control. Thus, an accurate positioning control can be obtained irrespective of the relative location, the floating height and the azimuth angle of the head with respect to the hard disk.

Figure 9:
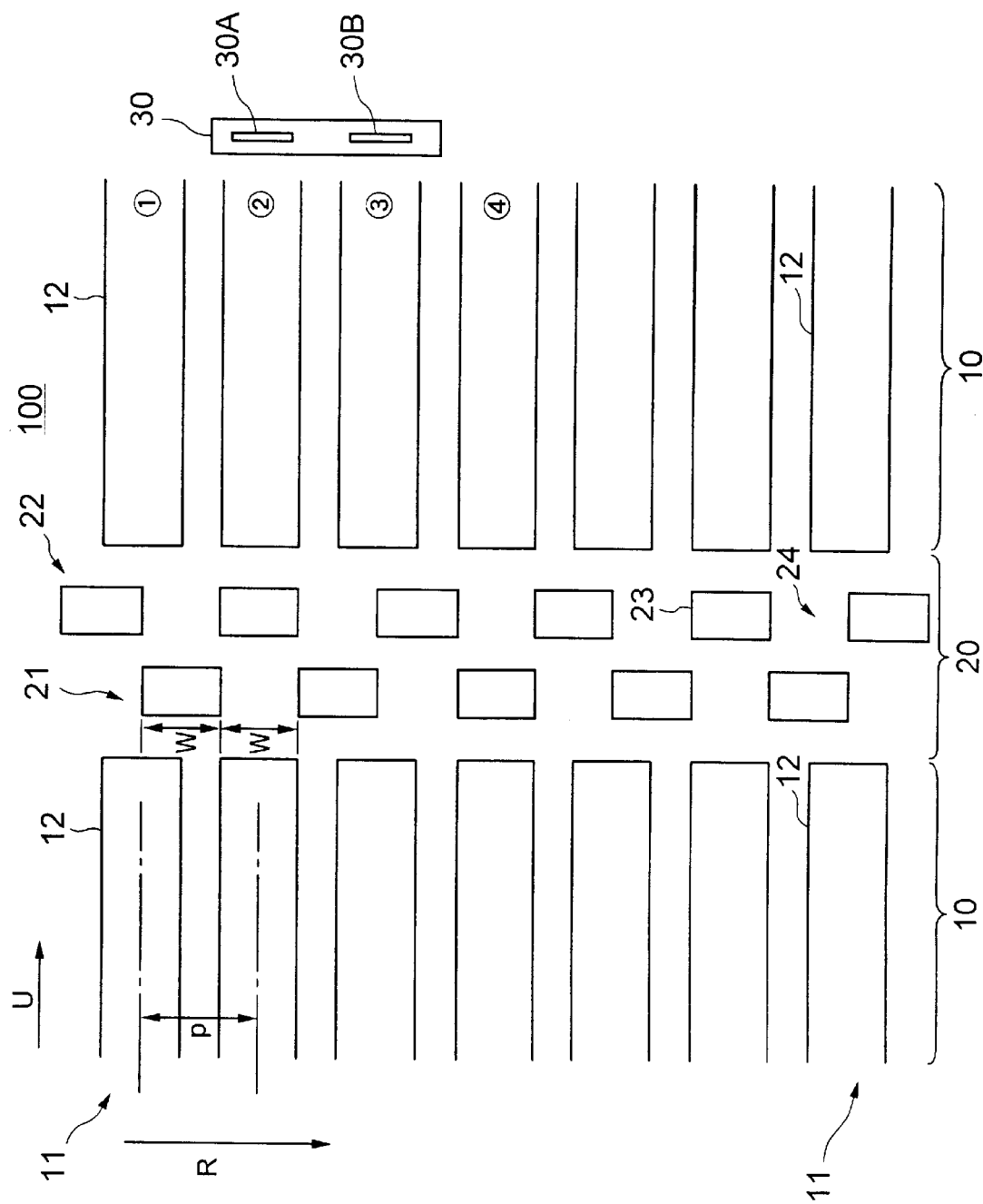
FIG. 9 is a partial top plan view of a recording disk according to a third embodiment of the present invention.

Referring to FIG. 9, a recording disk 100 according to a third embodiment of the present invention is similar to the second embodiment except for the deviation between the first column pattern 21 and the second column pattern 22 in the radial direction "R". More specifically, in the present embodiment, the first column pattern 21 and the second column pattern 22 have deviation therebetween which is equal to λ/2, wherein λ is selected at 4p/m in each servo-burst pattern 21 or 22.

In FIG. 9, the pitch of the reproducing heads 30A and 30B in the head assembly 30 is expressed by (4l+3)p or (4j+1)p wherein "l" and "j" are integers not lower than zero. In the example shown in FIG. 9, the pitch of the heads is equal to the track pitch "p" wherein j=0 is substituted for the expression (4j+1)p, and thus is equal to 4 λ/3.

When the head 30A is to be controlled onto the outermost track ① by tracking, assuming that the maximum level of the reproduced signal output from the head 30A is a unit level, the head 30A reproduces a ½ level for the signal A from the first column pattern 21, and at the same time the head 30B reproduces a zero level for the signal B⁻ from the first column pattern 21. Further, the head 30A reproduces a ½ level for the signal A⁻ from the second column pattern 22, and at the same time the head 30B reproduces a unit level for the signal B from the second column pattern 22.

FIG. 6 also shows the servo-burst signals A, A⁻, B and B⁻ output from the reproducing heads shown in FIG. 9. The reproduced signals A, A⁻, B and B⁻ change similarly to the second embodiment upon movement of the reproducing heads 30A and 30B in the direction "R", wherein A, A⁻, B and B⁻ have phase differences similar to those in the second embodiment.

Figure 8:
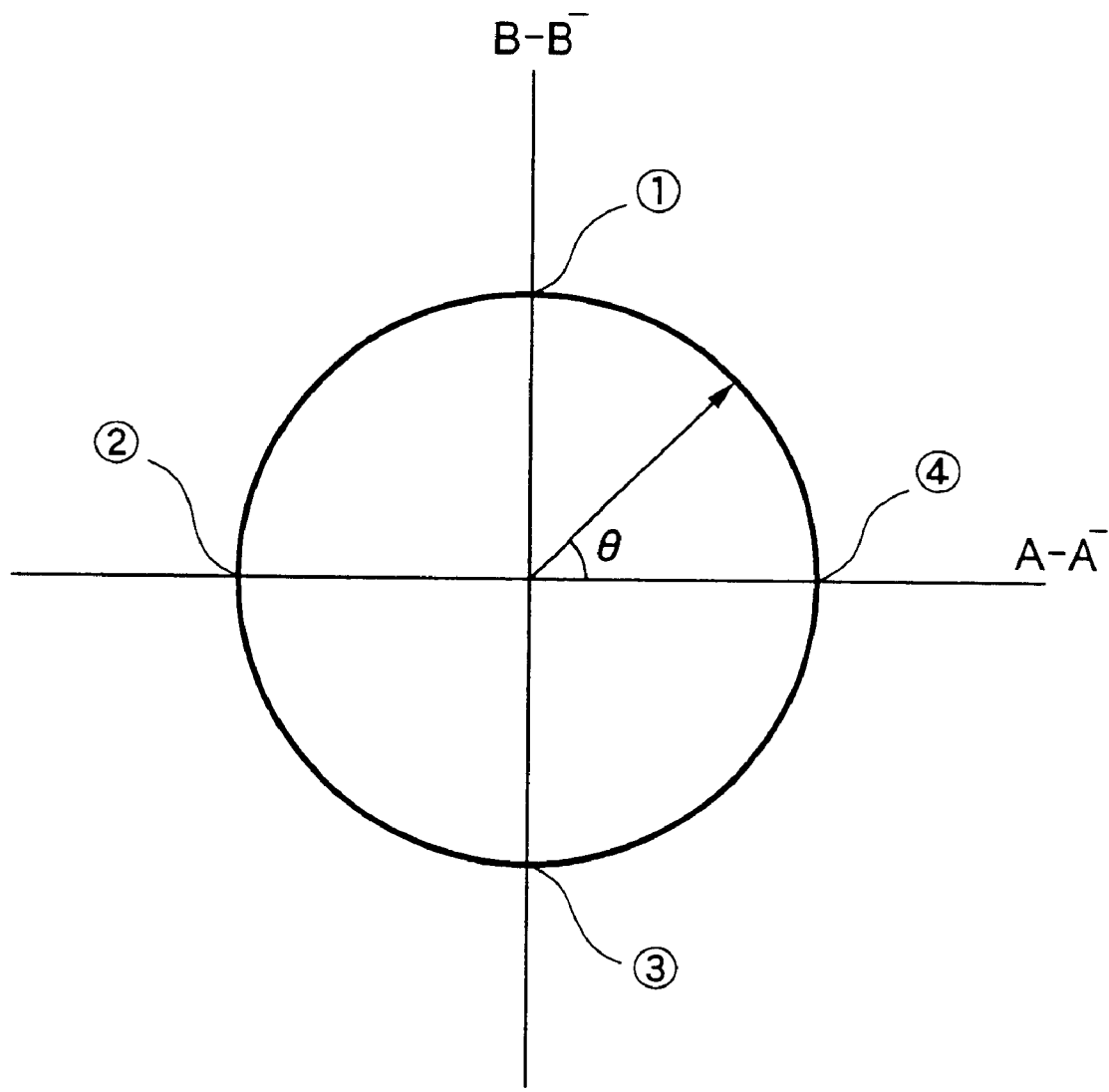
FIG. 8 is a graph of circular Lissajous figure obtained by synthesis of servo-burst signals shown in FIG. 6.

By subtracting the signal A⁻ from the signal A and the signal B⁻ from the signal B, two-phase sinusoidal signals A–A⁻ and B–B⁻ having a phase difference of 90° therebetween can be obtained, as shown in FIG. 7. In addition, a circular Lissajous figure is obtained as shown in FIG. 8. By calculating the vector angle θ from the circular Lissajous figure, the deviation of the heads 30A and 30B with respect to the track center is obtained, whereas the direction of the deviation is obtained from the increase and decrease of the vector angle θ, for controlling the heads for tracking.

In accordance with the present embodiment, an accurate positioning control can be conducted irrespective of the relative location, floating height and azimuth angle of the heads with respect to the hard disk. In addition, the number of servo-burst patterns can be reduced compared to the conventional disk having four columns of servo-burst pattern, with the advantage that two-phase signals having opposite phases can be obtained, thereby allowing compensation of an offset fluctuation and a higher-harmonic distortion. As a specific advantage, if the heads are deviated in a large amount from the specified location due to vibration of the disk etc., an accurate location can be easily obtained for allowing the heads to return to the proper position without using complicated steps of calculation.

Figure 10:
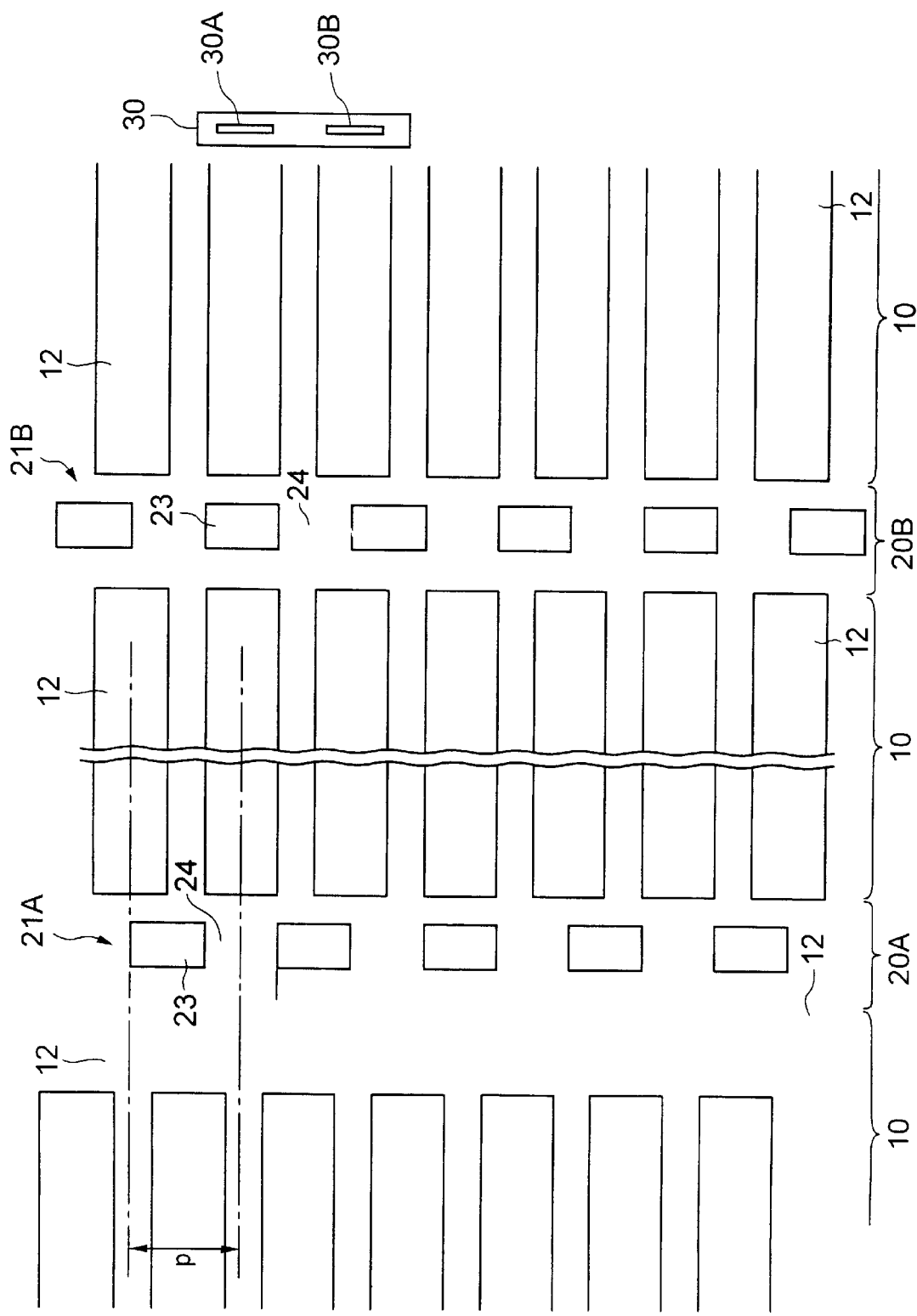
FIG. 10 is a partial top plan view of a recording disk according to a fourth embodiment of present invention.

Referring to FIG. 10, a recording disk according to a fourth embodiment of the present invention is similar to the first embodiment except for the patterns in the servo-burst areas. More specifically, each servo-burst area 20A or 20B has a single column for the servo-burst pattern 21A or 21B, wherein the period λ is expressed by λ=3p/4 and each two adjacent servo-burst areas 20A and 20B include servo-burst patterns having opposite phases. The head pitch is equal to the track pitch "p". In these configurations, since two adjacent servo-burst areas 20A and 20B provide servo-burst signals having opposite phases, zero point adjustment can be easily conducted.

In general, two heads reading a single column servo-burst pattern do not provide reproduced servo-burst signals having opposite phases, as described before, which necessitates correction of zero point vibration or high harmonic distortion by using other means. In this respect, the present embodiment is especially effective in correcting the high harmonic distortion by using a servo-burst area which has signal sections and non-signal sections arranged with a specified period and using the adjacent servo-burst areas.

The conventional recording disk and the recording disks of the above embodiments have servo-burst area including a signal section having a length equal to the length of the non-signal section. In this configuration, if servo-burst signals having opposite phases cannot be obtained in the servo-burst area, and the reproducing head width is smaller than the non-signal section width of the servo-burst area, non-sensitive area will be increased, which causes a large high-harmonic distortion and inaccurate positioning control. In an embodiment of the present invention, a configuration wherein the non-signal section has a length smaller than the length of the signal section provides reduction of the non-sensitive area and improves the positioning accuracy.

Figure 11:
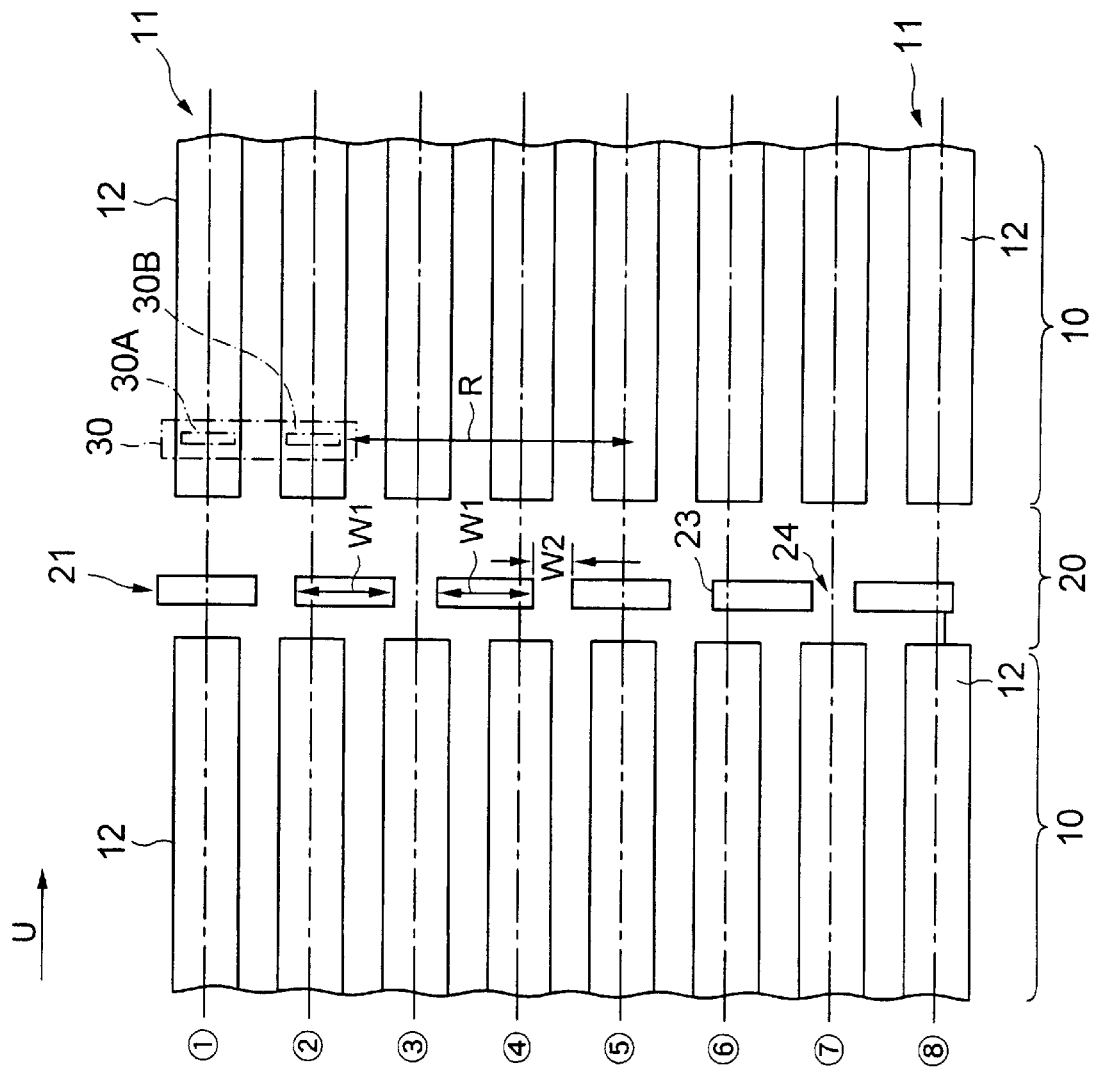
FIG. 11 is a partial top plan view of a recording disk according to a fifth embodiment of present invention

Referring to FIG. 11, a recording disk according to a fifth embodiment of the present invention has a configuration wherein the period λ is expressed by λ=4p/3, i.e. n=2 and m=3 are substituted for λ=2p×n/m. The servo-burst area 20 has a single column pattern 21, wherein the length (W2) of the non-signal section 24 is smaller than the length (W1) of the signal section 23. In a more preferable configuration, W2≦0.7×W1 where λ=W1+W2. This configuration provides most effective reduction of the non-sensitive area in consideration of the design for the current track width and the reproducing head in the disk drive.

In the present embodiment, for example, the recording disk is implemented as a hard disk wherein each data track has a width of around 1 to 3 micrometers, and is arranged with a track pitch of (W1+W2)×3/4 in the radial direction. In this configuration, p=($\lambda$/2)×3/2=3 $\lambda$/4 because of m=3 and n=2 substituted for p=($\lambda$/2)×m/n.

The number of data blocks 12 depends on the rotational speed of the disk, and may be 84 in a typical example. In this case, the total user area including the data areas 10 is as high as 90% of the total disk area including the data areas 10 and the servo-burst areas 20.

In each servo-burst area 20, a plurality of servo-ID are recorded corresponding to the data blocks 12 for identification thereof. This may apply to all the embodiments described above. In the case of a hard disk, the recording disk is driven with a rotational speed of around 5400 to 20000 rpm, and recording/reproduction of data is effected by the head gaps of the reproducing heads 30A and 30B in the head assembly 30 while accurately positioning the head assembly 30 by a positioning control system using the servo-burst patterns.

The recording/reproducing heads 30A and 30B generate two-phase servo-burst signals having a phase difference of 90° therebetween based on the servo-burst signals read from the servo-burst pattern. The positional deviation of the reproducing heads 30A and 30B with respect to the track center is detected from the two-phase servo-burst signals, and the positioning control is conducted based on the detected positional deviation. In a more preferred embodiment, a zero point is calculated and the zero point fluctuation is corrected based on the feature of the two-phase signals that one of the two signals assumes a maximum or a minimum when the other assumes zero.

Figure 12:
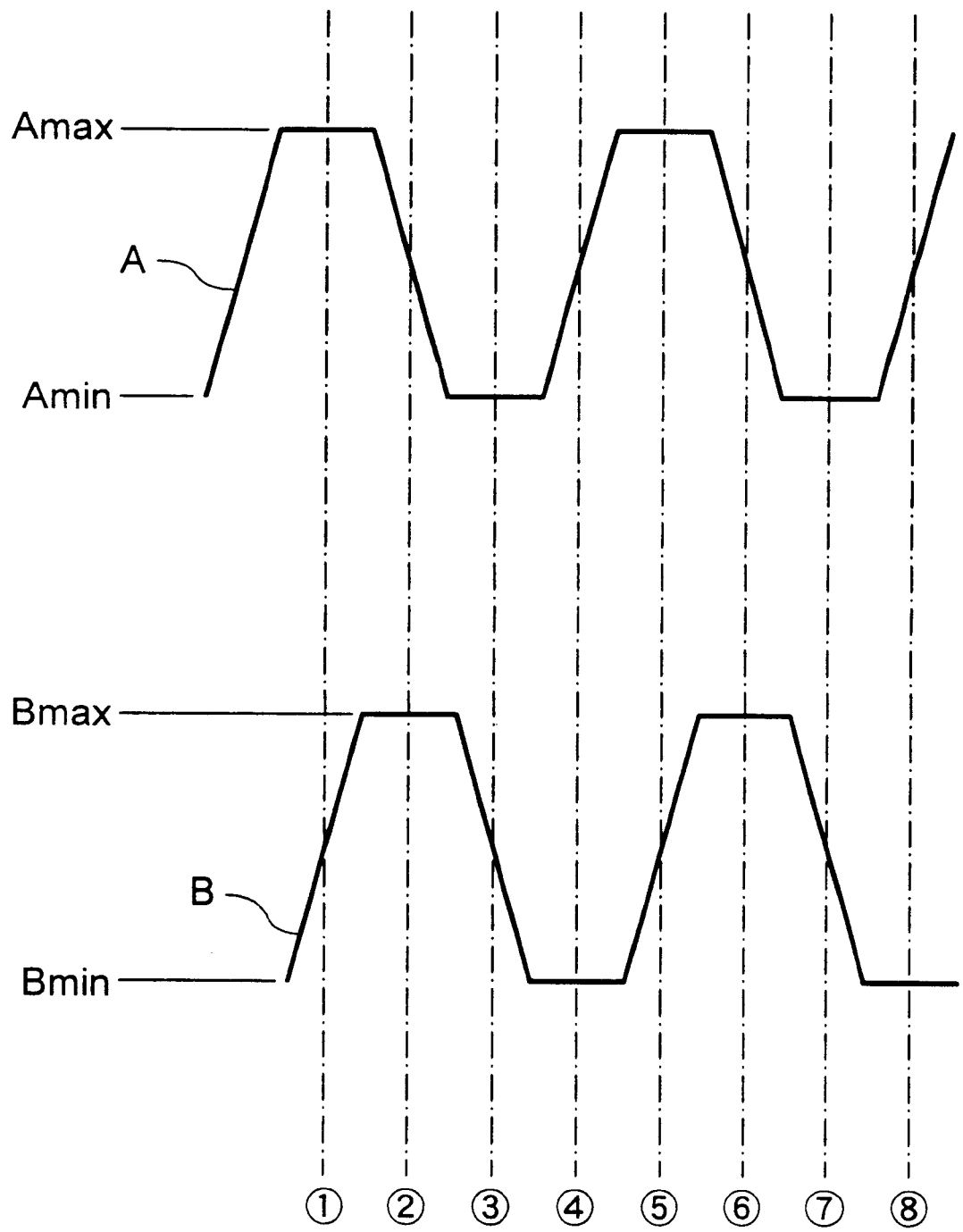
FIG. 12 is a graph of circular Lissajous figure obtained by synthesis of servo-burst signals obtained from the recording disk of FIG. 11.

The arrangement of the heads in the present embodiment should be such that a pair of signals having a phase difference of 90° is obtained from the arrangement, and should have a specified relationship with the track pitch "p". The pitch of the heads 30A and 30B in the head assembly 30 is selected at "p" obtained by substituting j=0 for the expression (2j+1)p. The heads 30A and 30B generates servo-burst signals "A" and "B", respectively, from the arrangement of the servo-burst pattern. FIG. 12 shows the servo-burst signals A and B obtained from the heads 30A and 30B upon movement of the heads in the direction "R". The servo-burst signals have a phase difference of 90° therebetween, thereby allowing positioning control for the heads.

Since the servo-burst signals A and B fluctuate at their centers of the amplification, i.e., zero points, the error for the positioning control is large if each of the signals is used for the positional signal as it is. Thus, the error should be suppressed by correcting the zero point fluctuation.

Figure 13:
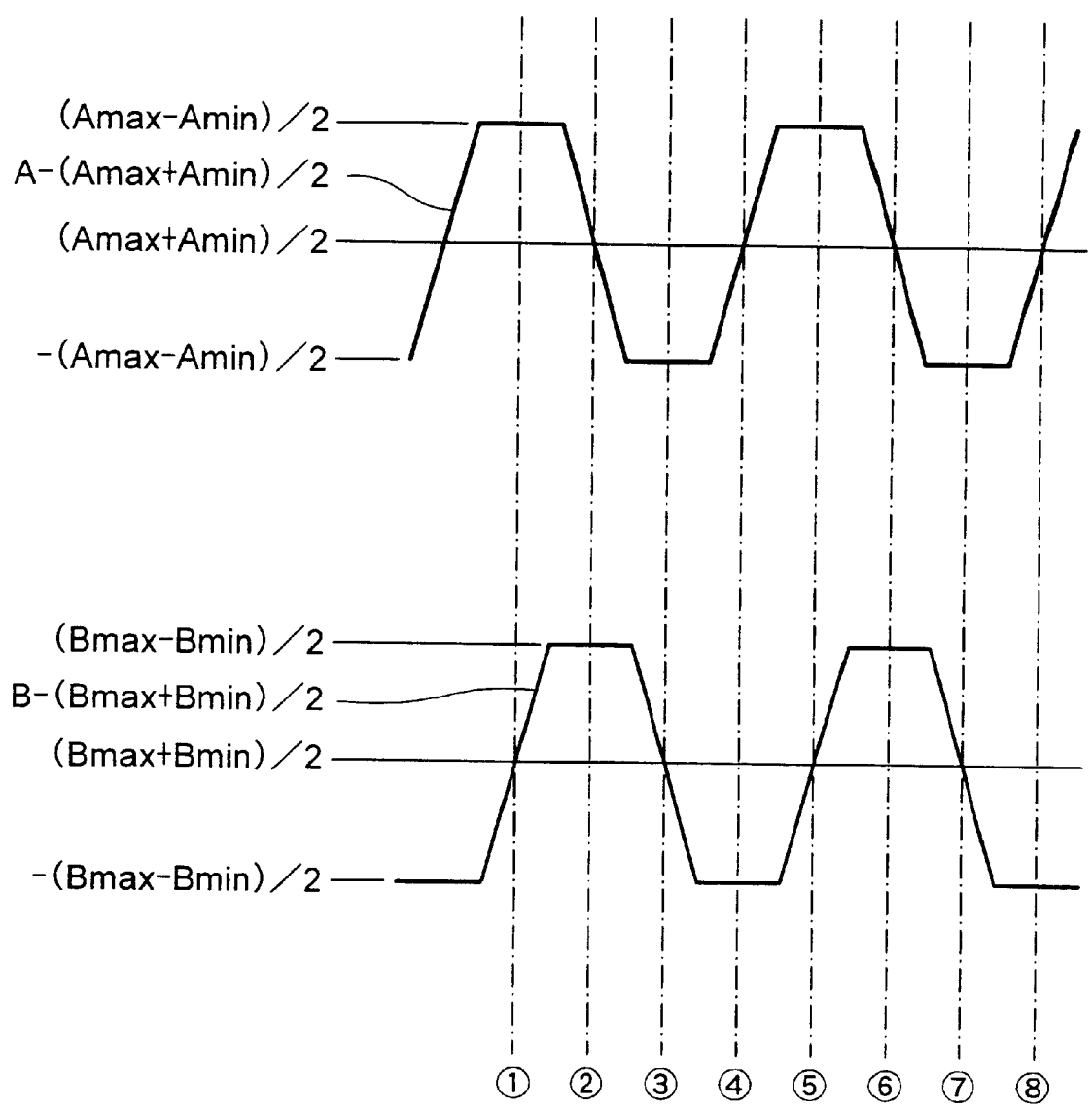
FIG. 13 is a graph of signals obtained by synthesis of servo-burst signals shown in FIG. 12.
Figure 14:
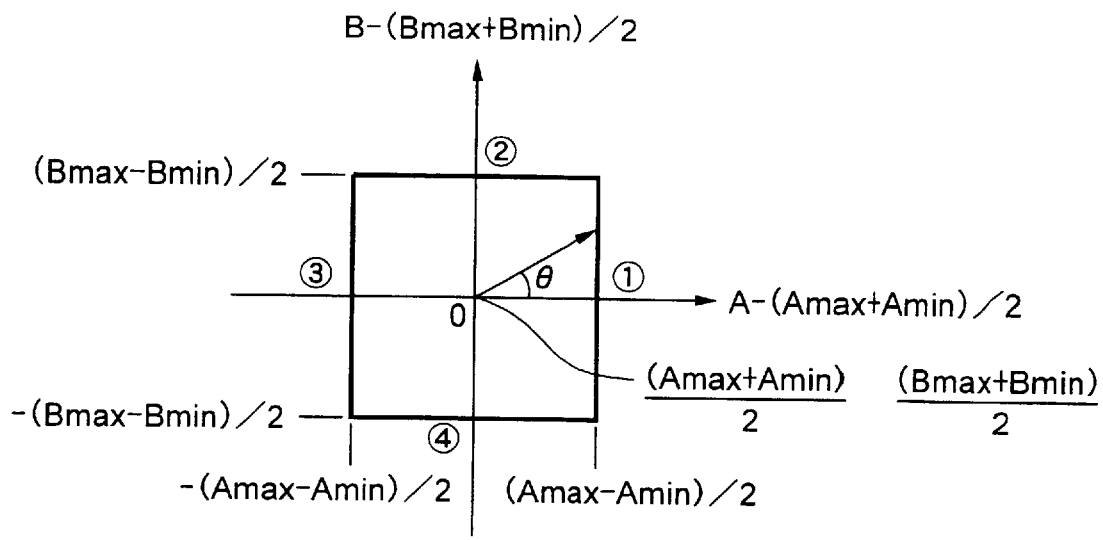
FIG. 14 is a graph of circular Lissajous figure obtained by synthesis of servo-burst signals shown in FIG. 13.

The zero point correction is started by detecting the maximums Amax and Bmax and minimums Amin and Bmin of the servo-burst signals. The detected maximums and minimums are subjected to averaging to obtain (Amax+Amin)/2 and (Bmax+Bmin)/2, followed by calculation of the amplitude centers of the signals A and B therefrom. Then, after calculating A−(Amax+Amin)/2 and B—(Bmax+Bmin)/2, the graph shown in FIG. 13 can be obtained, wherein the amplitude centers are corrected in addition to provision of the two-phase signals having a phase difference of 90° therebetween. FIG. 14 shows a Lissajous figure by plotting A−(Amax+Amin)/2 signal on the abscissa with B—(Bmax+Bmin)/2 signal plotted on the ordinate.

In FIG. 14, the locations of the heads 30A and 30B are expressed by the locus of the Lissajous figure, wherein the locations are defined by the vector angle $\theta$ between the A−(Amax+Amin)/2 signal and the B—(Bmax+Bmin)/2 signal. For example, if the head 30A resides on the outermost track ① then $\theta$=0, and if the head 30A resides on the track ② then $\theta$=$\pi$/2. Thus, by calculating the vector angle $\theta$, the deviation of the head 30A with respect to the track center can be detected, whereas the direction of the deviation can be detected by the increase or decrease of the vector angle $\theta$, to control the head 30A for tracking. The vector angle $\theta$ can be obtained by taking arctangent of the ratio of the B—(Bmax+Bmin)/2 signal to the A−(Amax+Amin)/2 signal.

For allowing some errors in the positioning control of the heads, the width for writing the data onto the track is suppressed to about 80% of the track pitch, whereas the width for reading the data therefrom is suppressed to about 60% of the track pitch, whereby an error of about 10% of the track pitch can be allowed theoretically for the accuracy in the positioning control.

In the present embodiment, an accurate positioning control can be obtained irrespective of the relative location, floating height and azimuth of the head with respect to the 0o recording disk. In addition, since positioning control with less high-harmonic distortion can be conducted even if two signals having opposite phases cannot be obtained, the present embodiment achieves reduction of the servo-burst area substantially without degradation of the tracking accuracy.

In a modification of the above embodiment, the servo-burst area has two columns of the pattern, wherein the first and the second column patterns may be deviated by $\lambda$/4 from each other in the radial direction, which allows a single head to be used for a positioning control system.

Samples of the present embodiment and comparative examples were fabricated as hard disks. In the samples of the embodiment, n=2 and m=3 are substituted for $\lambda$=2p×n/m, and different values for the length W2 of the non-signal section 24 were selected for the respective samples, with the length W1 of the signal section 23 being fixed, while maintaining W2<W1. The track pitch "p" of the hard disks was p=$\lambda$×3/4, and W1=2.4 micrometers. During reading data from the servo-burst patterns in the samples of the hard disks by using a magnetic head, positioning control was conducted to the magnetic head for verifying the accuracy of the positioning control. Each of the reproducing heads 30A and 30B was 1.7 micrometers wide in the gap width, and arranged with a pitch of 3$\lambda$/4.

Figure 15:
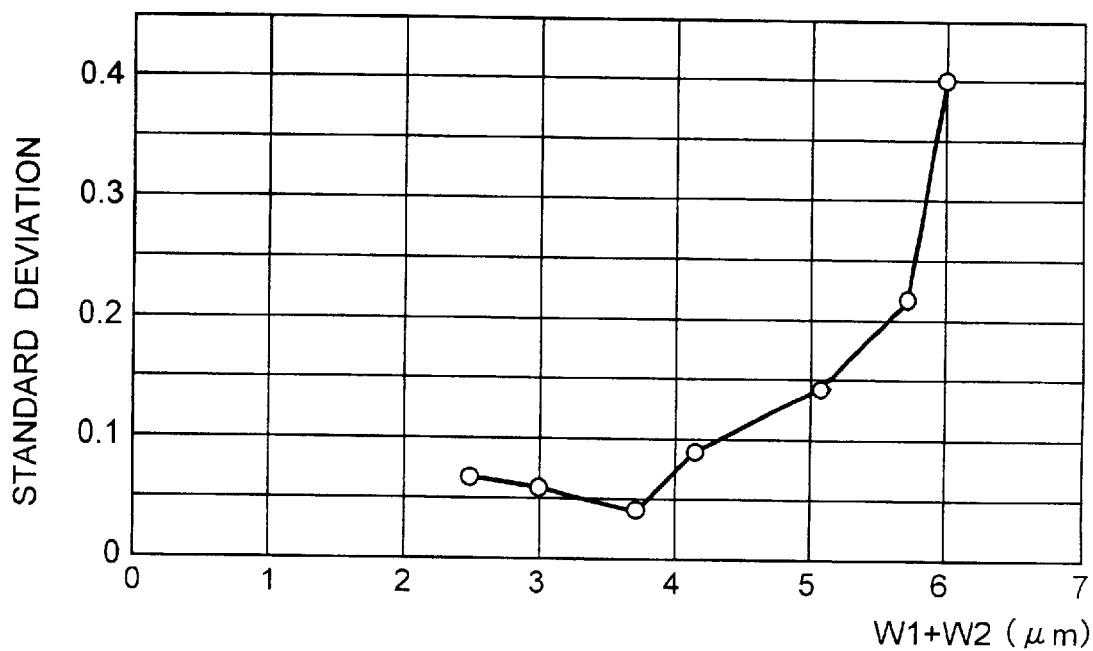
FIG. 15 is a graph of standard deviation plotted against the length of servo-burst signal for showing accuracy of samples of the recording disk of FIG. 11.

FIG. 15 shows the results obtained from the samples as described above. The period $\lambda$=W1+W2 is plotted on the abscissa in micrometers against the standard deviation of the measured head locations plotted on the ordinate. As shown in FIG. 15, in the range of W1+W2 lower than 4.1 micrometers, the standard deviation remains within a suitable range of 0.05 to 0.1, whereas the range of W1+W2 above 4.1 micrometers, the standard deviation increases abruptly, due to the influence by the secondary-harmonic distortion. In this respect, for W1+W2 at about 6.0 micrometers, the standard deviation is deteriorated up to about 0.4, which is undesirable. From these the results, it is confirmed that a satisfactory positioning control can be obtained in the range of W1+W2 not higher than 4.1 micrometers, which means W2$\leq$4.1−2.4=1.7 (micrometers). In other words, W2/W1$\leq$0.7, i.e., W2$\leq$0.7×XW1 provides a satisfactory positioning control having a higher accuracy. This ratio between W2 and W1 provides most effective reduction of the non-sensitive area in consideration for the design of the current track width and the reproducing heads in the disk drive.

Figure 16:
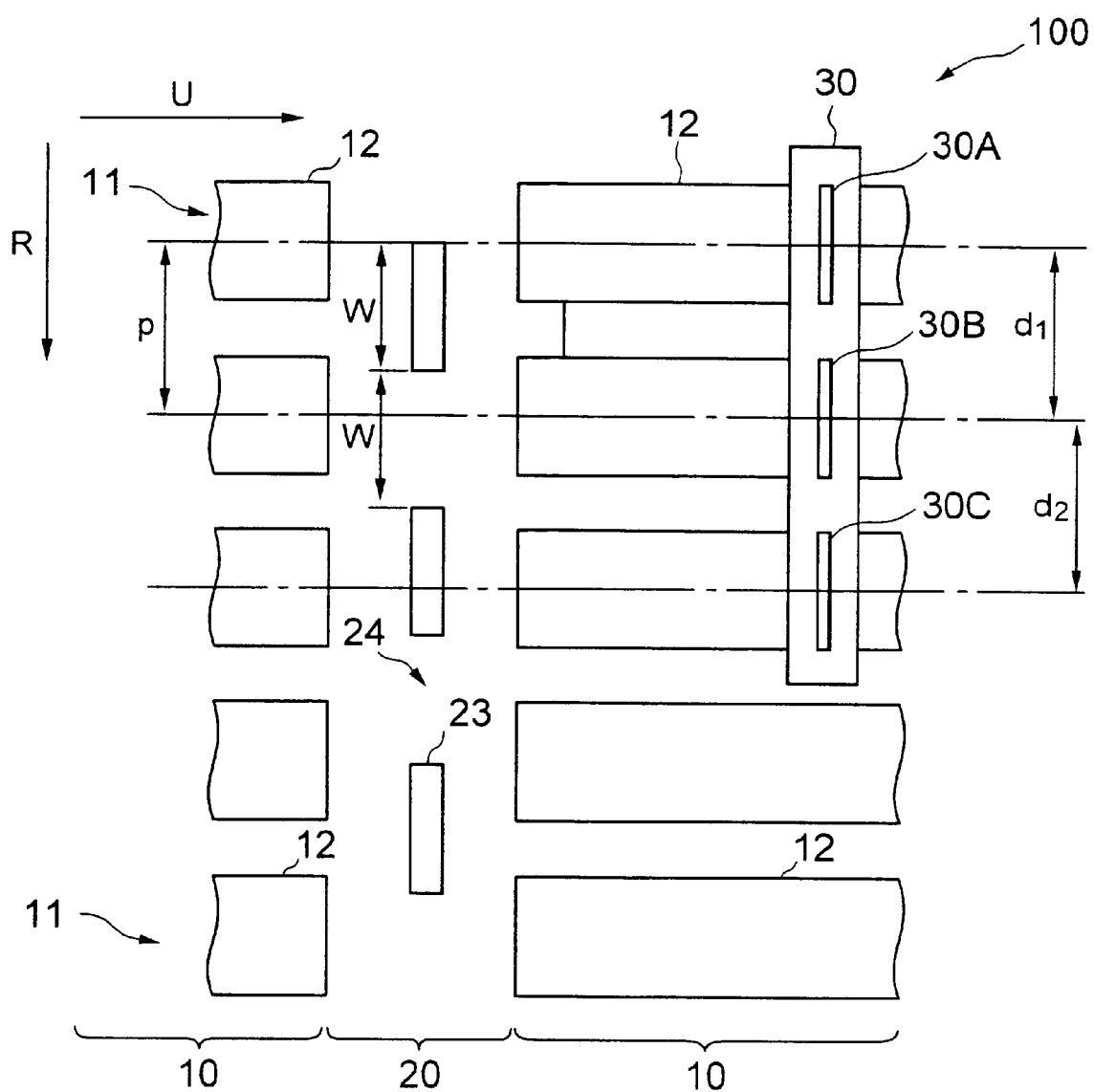
FIG. 16 is a partial top plan view of a recording disk according to a sixth embodiment of the present invention.

Referring to FIG. 16, there is shown a recording disk according to a sixth embodiment of the present invention, wherein n=3 and m=2 are substituted for the expression $\lambda$=2p×n/m of the servo-burst pattern.

For example, the length W of the signal section 23 is generally selected based on the following relationship:

W=3p/(3i+1) or

W=3p/(3i+2)

wherein "i" is an integer not lower than zero. In the example shown in FIG. 16, i=1 is substituted for W=3p/(3i+1) to obtain W=3p/4.

In the disk drive for the recording disk shown in FIG. 16, three reproducing heads 30A, 30B and 30C are arranged in the radial direction "R" with a pitch having a specified relationship with the track pitch "p". The centers of the reproducing heads are controlled to align with the centers of the respective tracks 11. The three reproducing heads 30A, 30B and 30C generate three-phase servo-burst signals based on the servo-burst pattern in the servo-burst area 20.

Assuming that the distance between the heads 30A and 30B and the distance between the heads 30A and 30C are d1 and d2, respectively, the exemplified heads have a relationship between the track pitch "p" and the distances d1 and d2 as follows:

d1=(3j+1)p and d2=(3k+2)p wherein "j" and "k" are integers not lower than zero.

For j=k=0, d1=p and d2=2p which coincide with the configuration shown in FIG. 16. That is, the pitch of the heads 30A, 30B and 30C is equal to the track pitch. By employing this configuration, upon movement of the heads 30A, 30B and 30C in unison in the radial direction "R", the heads 30A and 30B generate a pair of periodic signals having a phase difference of 120° therebetween and an is equal amplitude, which allows an accurate positioning control of the heads. In addition, the signal reproduced by the head 30C has a relationship of opposite phase with respect to the sum of the signals reproduced by the heads 30A and 30B.

Thus, the servo-burst signals "A", "B" and "C" output from the heads 30A, 30B and 30C, respectively, can be used for generating locational signals A–(B+C)/2, B—(A+C)/2 and C—(A+B)/2, which provide an accurate locations for the head substantially free from the offset fluctuation. The positioning control of the heads can be conducted by using arbitrary two of the locational signals A–(B+C)/2, B—(A+C)/2 and C—(A+B)/2. In addition, by making a sum and a difference between arbitrary two of these locational signals, two-phase signals having a phase difference of 90° can be obtained. Further, by multiplying one of the sum and differential signals by a constant to obtain an equal amplitude for both the sum and differential signals, a Lissajous figure shown in FIG. 17 can be obtained.

Figure 17:
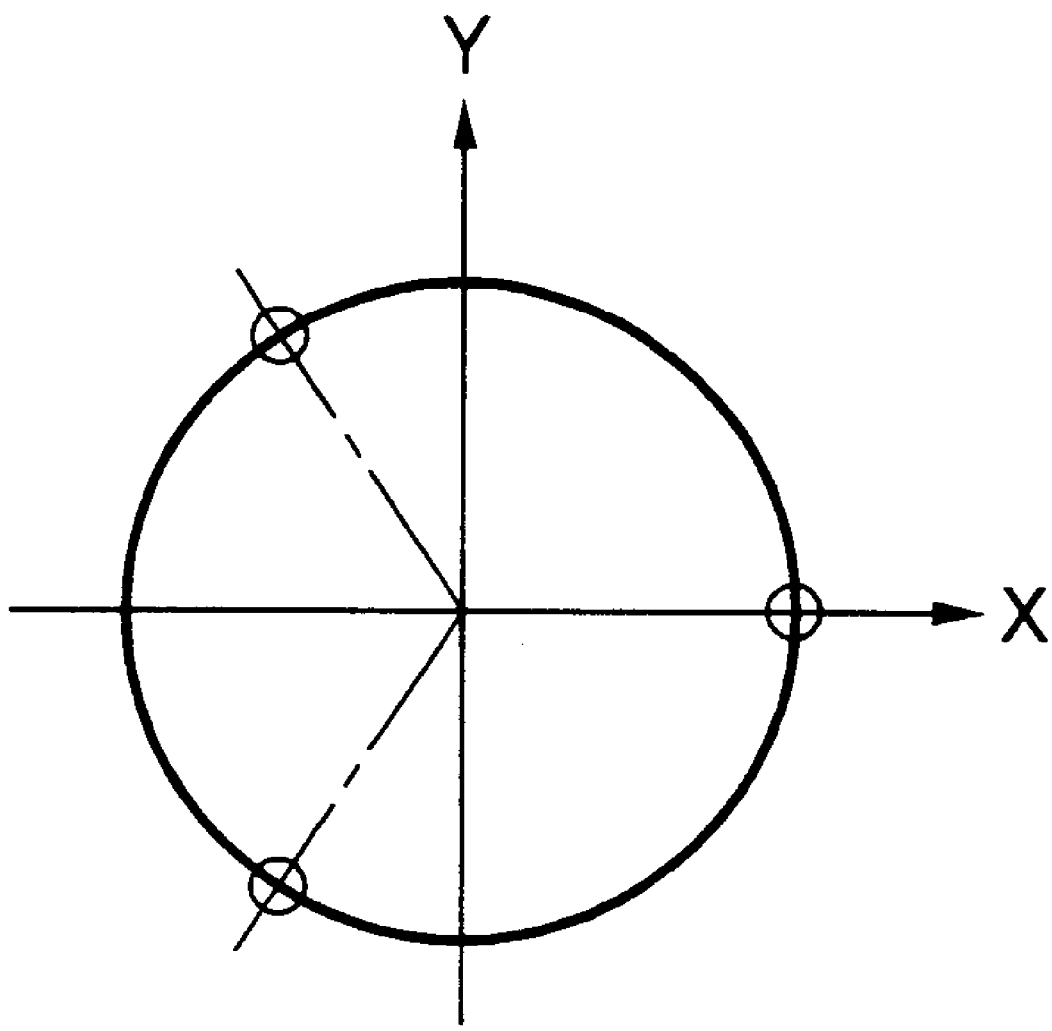
FIG. 17 is a graph of circular Lissajous figure obtained by synthesis of servo-burst signals reproduced from the recording disk of FIG. 16.

Accordingly, by multiplying at least one of the sum signal and the difference signal obtained from the normalized signals by a constant so that the amplitudes of the sum signal and the difference signal become equal to each other, a circular Lissajous figure can be obtained on the X-Y plane, as shown in FIG. 17. In the multiplication, $1/3^{0.5}$, for example, is used as the constant for multiplication of the difference signal. The track center on which each reproducing head is to be positioned corresponds to specified points on the circumference of the Lissajous figure shown in FIG. 17. Thus, by correcting the location of the head so that the detected signal resides on one of the specified positions, the reproducing head can be positioned accurately on the specified track center for positioning control. If only two signals can be obtained from the servo-burst pattern, or if the signal C cannot be obtained, for example, a normalization procedure can be employed for removing the off-set fluctuation. Specifically, after calculating the zero points (A0 and B0) and the amplitudes (AA and BB) of the signals A and B based on the maximums and the minimums of the signals A and B, normalized signals A* and B* are then calculated based on the following expressions:

A*=(A–A0)/AA and B*=(B–B0)/BB.

The positioning control of the reproducing head can be conducted based on the following manner. The lo reproducing heads 30A and 30B, which read the signal sections 23 in the servo-burst area 20 upon movement of the reproducing heads in the radial direction "R", reproduce a pair of sinusoidal signals having a phase difference of 120° therebetween. The sum signal and the difference signal obtained from these sinusoidal signals after normalization are also sinusoidal signals having a phase difference of 90° therebetween, as in the case of encoder signals generally used for positioning control of the head.

One of the reproducing heads 30A, 30B and 30C can be used as recording head. However, in general, a dedicated recording head is more preferable because the writing speed is generally lower than the reading speed. If a recording head is provided separately from the reproducing heads, the recording head should be located in alignment with a corresponding one of the reproducing heads in the radial direction.

In the present invention, the recording medium may be applied to any of recording disk, card and tape etc, which may be recorded in magnetic recording technique or optical recording technique.

Since the above embodiments are described only for examples, the present invention is not limited to the above embodiments and various modifications or alterations can be easily made therefrom by those skilled in the art without departing from the scope of the present invention.

What is claimed is:

1. A recording medium for storing data to be reproduced by a plurality of recording/reproducing heads, said recording medium comprising:

a plurality of data tracks extending in a moving direction of said recording medium and arranged with a track pitch "p" in a normal direction perpendicular to said moving direction, each of said data tracks having a plurality of data blocks arranged in said moving direction, a plurality of said data blocks arranged in said normal direction forming a data area; and a servo-burst area disposed between each adjacent two of said data area and having a signal pattern arranged in a single column or two columns extending in said normal direction, said servo-burst area including a periodic servo-burst pattern having a period λ in said normal direction, wherein λ=2p X n/m, given n and im being natural numbers and prime to each other, with a relationship n/m<2 therebetween.

2. The recording medium as defined in claim 1, wherein n=3.

3. A data recording/reproducing device having said plurality of recording/reproducing heads for recording/ reproducing data to/from the recording medium as defined in claim 2.

4. The data recording/reproducing device as defined in claim 3, comprising first and second reproducing heads arranged in said normal direction with a pitch of (3j+1)p or (3j+2)p, given j being an integer not lower than zero.

5. The data recording/reproducing device as defined in claim 3, comprising first through third reproducing heads arranged in said normal direction so that distances between said first reproducing head and said second reproducing head and between said first reproducing head and said third reproducing head are (3j+1)p and (3k+2)p, respectively, given j and k being integers not lower than zero.

6. The recording medium as defined in claim 1, wherein said servo-burst pattern has protrusion and depression alternately arranged with said period $\lambda$.

7. A recording medium comprising:

a plurality of data tracks extending in a moving direction of said recording medium and arranged with a track pitch "p" in a normal direction perpendicular to said moving direction, each of said data tracks having a plurality of data blocks arranged in said moving direction, a plurality of said data blocks arranged in said normal direction forms a data area; and a servo-burst area disposed between each adjacent two of said data area and having a signal pattern in a single column or two columns extending in said normal direction, said servo-burst area including a periodic servo-burst pattern having a period $\lambda$ in said normal direction, wherein $\lambda=4p/m$, given m being a natural number and prime to the number 2, with a relationship m>1.

8. A data recording/reproducing device having said plurality of recording/reproducing heads for recording/ reproducing data to/from the recording medium as defined in claim 7.

9. The data recording/reproducing device as defined in claim 8, comprising first and second reproducing heads arranged in said normal direction with a pitch of (2j+1)p, given j being an integer not lower than zero.

10. The data recording/reproducing device as defined in claim 8, comprising first through third reproducing heads arranged in said normal direction so that distances between said first reproducing head and said second reproducing head and between said first reproducing head and said third reproducing head are (2j+1)p and (4k+2)p, given j and k being integers not lower than zero.

11. The data recording/reproducing device as defined in claim 8, comprising first through fourth reproducing heads arranged in said normal direction so that distances between said first reproducing head and said second reproducing head, between said first reproducing head and said third reproducing head and between said first reproducing head and said fourth reproducing head are (2j+1)p, (4k+2)p and (4l+3)p, given j, k and l being integers not lower than zero.

12. The recording medium as defined in claim 7, wherein said servo-burst area includes periodic first and second column patterns as said periodic servo-burst patterns, said first and second column patterns deviates from each other in said normal direction by $\lambda/2$ or $\lambda/4$.

13. The recording medium as defined in claim 7, wherein two adjacent servo-burst areas include said periodic servo-burst patterns having opposite phases therebetween.

14. A recording medium comprising:

a plurality of data tracks extending in a moving direction of said recording medium and arranged with a track pitch "p" in a normal direction perpendicular to said moving direction, each of said data tracks having a plurality of data blocks arranged in said moving direction, a plurality of said data blocks arranged in said normal direction forms a data area; and a servo-burst area disposed between each adjacent two of said data area and having a signal pattern in a single column or two columns extending in said direction, said servo-burst area including a periodic servo-burst pattern having a period $\lambda$ in said normal direction, wherein $\lambda=4p/m$, given m being a natural number and prime to the number 2, with a relationship m>1 and said servo-burst pattern includes signal sections and non-signal sections alternately arranged in said normal direction, and each of said signal sections and each of said non-signal sections have lengths of W1 and W2 where a relationship W21<W1 holds therebetween.

15. The recording medium as defined in claim 14, wherein $W2 \leq 0.7 \times W1$.

16. The recording medium as defined in claims, wherein said servo-burst pattern has a protrusion and depression alternately arranged with said period $\lambda$.

\* \* \* \* \*